UNITED STATES PATENT OFFICE.

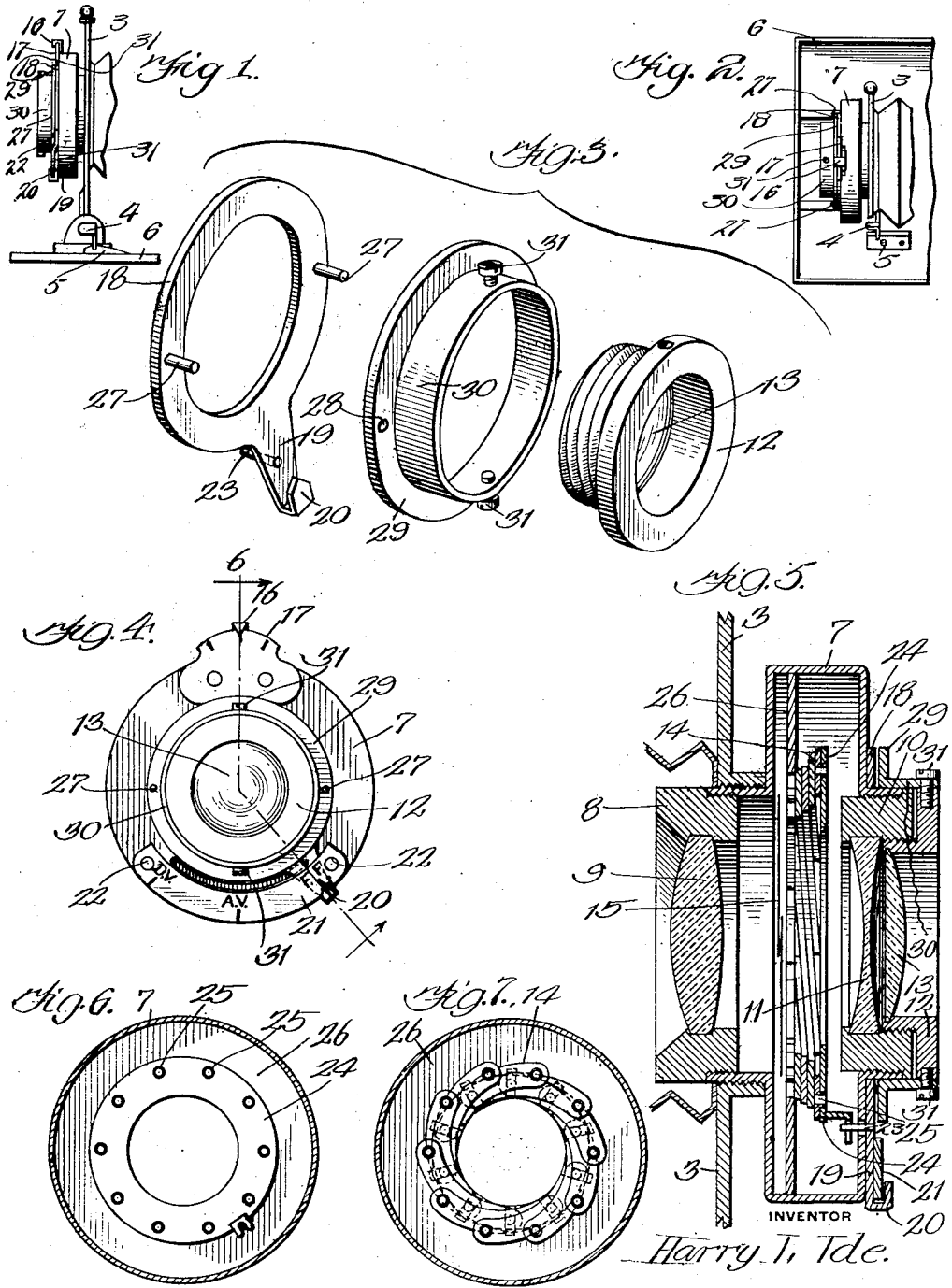

HARRY L. IDE, OF SPRINGFIELD, ILLINOIS, ASSIGNOR OF ONE-HALF TO ROY W. IDE, OF SPRINGFIELD, ILLINOIS.

FOCUSING-LENS AND DIAPHRAGM STRUCTURE.

1,262,347.  Specification of Letters Patent.  Patented Apr. 9, 1918.

Application filed April 16, 1917. Serial No. 162,250.

*To all whom it may concern:*

Be it known that I, HARRY L. IDE, citizen of the United States, residing at Springfield, in the county of Sangamon and State of Illinois, have invented a certain new and useful Improvement in Focusing-Lenses and Diaphragm Structures, of which the following is a full, clear, concise, and exact description.

My invention relates to lens and diaphragm structures, being particularly adaptable to photographic cameras of the type employing at least two positive lenses and at least one negative lens that is in close proximity to one of said positive lenses, an iris, and mechanism for adjusting the iris to vary the size of its opening. In accordance with my invention I employ an adjustable carrier for one of the two latter lenses and which carrier is movable longitudinally of the axis of the lens system whereby said latter two lenses are relatively adjustable to vary the space between them. I connect the iris adjusting mechanism with this carrier so that whenever the iris opening is adjusted the space between the relatively adjustable lenses is adjusted at the same time. As a consequence of the adjustment of the space between said relatively adjustable lenses the camera is focally adjusted to suit the nature of the subject to be photographed by the same operation that adjusts the iris opening to such subject. The mechanism that is common to the iris and to the adjustable lens is desirably inclusive of an index pointer and an arcal scale over which this pointer may travel, such scale preferably bearing the names of the general classes of subjects that may be photographed and which names are located at parts of the scale to which the pointer is to be moved when the subjects there named are to be photographed.

By means of my invention the iris, the device for adjusting the iris, and the correlation of the iris and such device need not be modified when such device is to perform the added function of positioning the adjustable lens. When the original iris adjusting mechanism is employed without modification I carefully correlate said adjustable lens carrier to such mechanism in order that the double function of such mechanism may be properly performed to establish the correct ratio between the iris opening and the space between the two relatively adjustable lenses.

I will explain my invention more fully by reference to the accompanying drawings showing the preferred embodiment thereof and in which Figure 1 is a side view of the front portion of a camera equipped with the device of my invention; Fig. 2 is a top view of the structure shown in Fig. 1; Fig. 3 illustrates the adjustable lens carrier and the mechanism that is common to the iris and the adjustable lens carrier for effecting the simultaneous adjustment of these two elements; Fig. 4 is a front view of the lens portion of the camera; Fig. 5 is a view on line 5—5 of Fig. 4; Fig. 6 illustrates the ring for opening and closing the iris and illustrating a part of the connection between this ring and the manually engageable part of the iris adjuster; and Fig. 7 illustrates the iris.

Like parts are indicated by similar characters of reference throughout the different figures.

The photographic camera illustrated is of the folding type, but to which type the invention is not to be limited. The front 3 of the carrier may be moved forward to a predetermined position and my invention enables me to provide but one location for this camera front which is positively determined by any suitable device such as the finger clip 4 which may be engaged within a notch provided in the plate 5 fixed upon the camera bed 6 as illustrated clearly in Figs. 1 and 2. The advantage of my invention in connection with a camera of the folding type is apparent when it is understood that the camera front may be given a fixed location when the camera is adjusted for operation rather than a selected location suited to the subjects being photographed.

The camera front (Fig. 5) carries a shutter case 7. At the inner end of this shutter case I have illustrated a normally fixed lens carrier 8 that holds a positive lens 9, which is given a fixed position with respect to the negative producing element of the camera. The front end of the shutter case 7 supports a normally fixed lens carrier 10 that holds a negative lens 11. The lens carrier 10 itself holds a lens carrier 12 which holds a positive lens 13 that is in close proximity to the negative lens 11. The lenses 11 and 13 together constitute a focusing lens structure. The lens carrier 12 is movable longitudinally of the axis of the lens system whereby the lenses 11 and 13 are relatively adjustable to vary the space between them. The iris 14 is here shown within the shutter case 7 between the negative lens 11 and the positive lens 9. The shutter is indicated at 15 within the case 7. I make no change in the shutter operating mechanism and as any suitable shutter operating mechanism may be employed I do not illustrate any owing to the complex nature thereof, the drawing (Fig. 4) indicating only the speed adjusting index 16 of the shutter operating mechanism and the suitable scale 17 which guides the user in positioning the index 16.

The iris adjusting mechanism includes a ring 18 that has an arm 19 whose outer end is bent back upon the arm to constitute an index pointer 20 and which pointer is spaced apart from the balance of the arm to permit a stationarily mounted scale 21 to be interposed between the pointer and the rest of the arm. The ends of this scale are offset so that they may be anchored to the shutter case 7 as indicated at 22, the arm 19 being free to move between the anchored ends of the scale and in the space between the scale and the shutter case. The arm 19 is provided with a pin 23 forming a part of one well known iris adjusting mechanism, this pin engaging the adjusting ring 24 that is connected, at 25, with the outer ends of the iris leaves. The inner ends of the iris leaves are in the usual pin and slot connection with the stationary plate 26. In Fig. 5 the iris is shown thicker than it really is and the plate 24 is not shown in its seat, these modifications being made in the drawing to render the illustration clear. I add the pins 27 to the ring 18, these pins extending longitudinally of the axis of the lens system and being freely received within holes 28 in the flange 29 of the lens adjusting collar which I also add to the structure. The cylindrical portion 30 of this collar carries binding screws 31 by means of which the adjustable lens carrier 12 is brought into fixed relation with the adjusting collar 30. The lens carrier 12 has threaded engagement with the lens carrier 10 and as the lens carrier 12 is connected with the iris adjusting ring 18 by means of the pins 27 and the flange 29, the carrier 12 is moved in or out with respect to the normally stationary lens 11 when the iris opening is made smaller or larger. The flange 29 slips along the pins 27 while these pins are in the holes 28 as the ring 18 is turned, the pins 27 moving in a fixed plane as the ring 18 carrying these pins has but a single plane of rotation.

The threaded engagement between the lens carriers 10 and 12 is carefully designed so that a given modification in the size of the iris opening is simultaneously accompanied by a proper focal adjustment that results from the accompanying modification of the space between the positive lens 13 and the negative lens 11. The index plate 21 may have the names of a variety of subjects whose pictures may be taken or the names of a number of classes or groups that are inclusive of such subjects. In Fig. 4 I have indicated the names of several classes or groups of subjects upon scale 21, space not permitting the indication of the names of these subjects. F F indicates the position to which the index pointer 20 may be placed when full figures of persons or other near views are to be photographed. In a camera of the type illustrated the full figures to be photographed may be six or eight feet away from the camera. When the index pointer is in this position the iris opening is largest and the space between the positive lens 13 and the negative lense 11 is the greatest, in the type of camera illustrated. When the index pointer is at the point A V various views may be taken that are, say, twenty-five feet away from the camera, such as street scenes. When the pointer 20 is placed at the point A V the iris opening is correspondingly reduced and the space between the lenses 11 and 13 is correspondingly reduced to secure corresponding focal adjustment. When the pointer is moved to the point D V distant views may be taken and in this adjustment the iris opening is smallest and the space between the lenses 11 and 13 is reduced to the minimum, the point D V being shown at one end of the range of travel of the pointer.

I have only shown three divisions upon the scale 21, it being quite apparent that other scale marks may be placed upon this scale that correspond to other objects having other distances from the camera.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A lens having two positive lenses and a negative lens in close proximity to one of said positive lenses, the latter two lenses constituting a focusing lens structure; an adjustable carrier for one of the two latter lenses and which carrier is movable longitudinally of the axis of the lens system whereby said latter two lenses are relatively adjustable to vary the space between them to effect focal adjustment; means whereby the remaining lens is given a fixed position; an iris; and mechanism common to said iris and the adjustable lens carrier that serves, in one operation, to alter the size of the iris opening and to alter the space between said relatively adjustable lenses to adjust the focus.

2. A lens having two positive lenses and a negative lens in close proximity to one of said positive lenses, the latter two lenses constituting a focusing lens structure; an adjustable carrier for one of the two latter lenses and which carrier is movable longitudinally of the axis of the lens system whereby said latter two lenses are relatively adjustable to vary the space between them to effect focal adjustment; an iris; and mechanism common to said iris and the adjustable lens carrier that serves, in one operation, to alter the size of the iris opening and to alter the space between said relatively adjustable lenses to adjust the focus.

In witness whereof I hereunto subscribe my name this 31st day of January, A. D. 1917.

HARRY L. IDE.